United States Patent Office 3,729,492
Patented Apr. 24, 1973

3,729,492
NAPHTHOQUINONE DERIVATIVES
Karl Bernauer, Allschwil, and Janos Borgulya and Erika Böhni, Basel, Switzerland, assignors to Hoffmann-La Roche Inc., Nutley, N.J.
No Drawing. Filed July 9, 1971, Ser. No. 162,029
Claims priority, application Switzerland, July 17, 1970, 10,905/70
Int. Cl. C07c 87/02, 87/64, 91/00, 93/00
U.S. Cl. 260—396 R        20 Claims

ABSTRACT OF THE DISCLOSURE

Novel naphthoquinone compounds represented by the formula

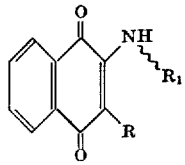

wherein R is hydrogen, halogen, or lower alkoxy, $R_1$ is a residue of the formula

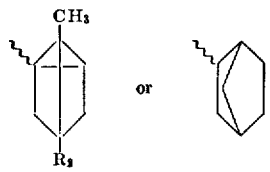

wherein $R_2$ is hydrogen, lower alkyl, optionally substituted phenyl or phenyl lower alkyl; and a process for their preparation are described.

DETAILED DESCRIPTION OF THE INVENTION

The present invention is directed to novel naphthoquinone derivatives represented by the formula

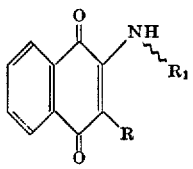

wherein R is hydrogen, halogen or lower alkoxy and $R_1$ is selected from radicals represented by the formulae

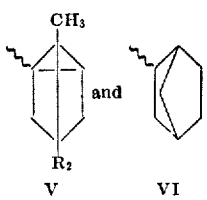

wherein $R_2$ is hydrogen, lower alkyl, phenyl, substituted phenyl and phenyl-lower alkyl; as well as a process for their preparation.

As utilized herein the terminology "lower alkyl" indicates straight or branched chain alkyl groups containing from one to seven carbon atoms such as, for example, methyl, ethyl, n-propyl, isopropyl, n-butyl, isobutyl, ter. butyl, amyl, hexyl and heptyl. The terminology "lower alkoxy" indicates those alkoxy radicals having from one to four carbon atoms such as, for example, methoxy, ethoxy, propyloxy, butyloxy and the like. When $R_2$ is a substituted phenyl radical, said substitutents are selected from the group consisting of halogen, preferably chlorine or bromine, nitro, amino and hydroxy. It is preferred that such substituents are in the para position. When $R_2$ is phenyl lower alkyl, the alkyl portion thereof contains from one to four carbon atoms. A preferred phenyl lower alkyl group is 2-phenylethyl.

In accordance with the present invention, compounds represented by Formula I may be prepared by reacting a compound represented by the formula

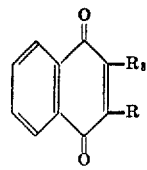

wherein R is as previously defined and $R_3$ is hydrogen or a leaving group, with an amine represented by the formula

        III wherein $R_1$ is as previously defined.

In accordance with the present invention the expression "leaving group" represents a group replaceable by an amino group such as, for example, acyloxy such as, acetoxy, propionoxy and the like; alkoxy such as methoxy, ethoxy and the like; aryloxy such as phenyloxy; aralkoxy such as benzyloxy and the like; arylsulfonyloxy such as tosyloxy and the like; alkylsulfonyloxy such as mesyloxy; arylthio; aralkylthio; hydroxy; halogen such as bromine or chlorine and the like.

The reaction of the compounds represented by Formula II with the amines represented by Formula III is expediently carried out in a suitable organic solvent. Such solvents include, for example, alcohols such as methanol, ethanol and the like; aliphatic hydrocarbons; halogenated aliphatic hydrocarbons such as methylene chloride; aromatic hydrocarbons such as benzene; nitrobenzene; dioxan; tetrahydrofuran; dimethylformamide, and the like.

The reaction is carried out at a temperature of from about room temperature to about 150° C., preferably at a temperature of from about 60° to 100° C. In carrying out the reaction, an excess of amine of Formula III is utilized to bind acid which is possibly released. For this purpose an organic amine which is otherwise inert under the reaction conditions can also be utilized. Suitable amines include, for example, triethylamine, pyridine and the like.

In addition, the compounds represented by Formula I may be prepared by oxidizing a compound represented by the formula

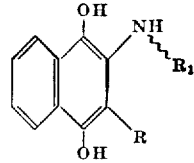

wherein R and $R_1$ are as defined above. The oxidation reaction may be carried out in a conventional manner such as, for example, by passing oxygen or air through the reaction solution, or by treatment with dilute hydrogen peroxide or a ferric iron salt or the like.

Further, the compounds represented by Formula I wherein R is hydrogen or a halogen other than chlorine may be, if desired, converted to the corresponding compound wherein R is chlorine by heating in a suitable inert solvent with, for example, lithium chloride or by passing chlorine gas through the reaction mixture. This reaction is expediently effected at a temperature of from about 50° C. to about 150° C., preferably from about 80° C. to about 120° C.

The compounds represented by Formula III wherein $R_1$ is a radical represented by Formula VI, i.e., a compound represented by the formula

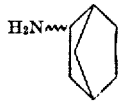

which are utilized as a starting material are known compounds and can be manufactured by conventional procedures such as, for example, by reduction of the corresponding oxime.

The compounds represented by Formula III wherein $R_1$ is a radical represented by Formula V, i.e., compounds represented by the formula

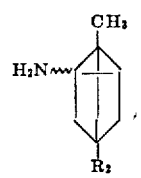

wherein $R_2$ is as previously defined are, with the exception of the compounds wherein $R_2$ is hydrogen, new compounds. These compounds can be prepared, for example, by reducing an oxime represented by the formula

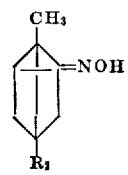

VII wherein $R_2$ is as defined previously, by optionally resolving the compound thus obtained and converting the resulting base, if desired, into an acid addition salt. The reduction is acomplished by known methods, for example, catalytic hydrogenation by for example platinum in glacial acetic acid, Raney-nickel in alcoholic ammonia and the like, or by chemical reduction, for example, treatment with sodium in alcohol, zinc in acetic acid, lithium aluminum hydride in ether and the like.

The compounds represented by Formula III occur in one or both of two stereo-isomeric forms, i.e., the exo and endo forms. Which of these forms predominates in the product depends on the method of reduction. Thus, reduction with sodium in alcohol yields predominately the endo form, reduction with lithium aluminum hydride yields practically pure exo form and catalytic hydrogenation yields a mixture of exo and endo in a proportion of about 3:7.

When utilizing the cofpounds represented by Formula III to form compounds represented by Formula I, optical antipodes and racemic mixtures of the starting compounds give rise to the corresponding antipodes or racemic mixtures of the final product.

If a mixture of the two stereoisomeric forms is obtained, these can be separated from each other in a known manner, such as, for example, on the basis of the different rates of crystallization of different salts, i.e., by fractional crystallization, especially of the acetates.

The compounds represented by Formula III wherein $R_1$ is a radical represented by Formula V are chiral and are therefore obtained in the form of racemates. If desired, these racemates can be resolved into the optical antipodes according to methods which are known in the art such as, for example, by fractional crystallization of the salts with optically active acids.

The compounds represented by Formula III are bases and can be converted, if desired, into acid addition salts. Suitable acids include, for example, inorganic acids such as hydrochloric acid, hydrobromic acid, sulphuric acid, phosphoric acid, and the like and organic acids such as, for example, acetic acid, tartaric acid, maleic acid, fumaric acid, citric acid, oxalic acid, toluenesulphonic acid and the like.

The oxime compounds represented by Formula VII are likewise new compounds with the exception of those compounds wherein $R_2$ is hydrogen, methyl, propyl or unsubstituted phenyl.

The compounds represented by Formula VII can be prepared, for example, by heating a compound represented by the formula

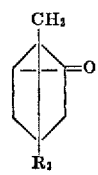

VIII wherein $R_2$ is as defined above with, for example, hydroxylamine hydrochloride and sodium ethylate in ethanol.

The compounds represented by Formula VIII are likewise new compounds with the exception of those wherein $R_2$ is hydrogen, methyl, ethyl, propyl, phenyl and substituted phenyl.

The compounds represented by Formula VIII wherein $R_2$ is as defined above, excluding hydrogen, may be prepared starting with camphor, by reaction with an organometallic compound selected from those represented by the formulae $$R_2'\text{—MgX}$$
$$R_2''\text{—CH=CH—CH}_2\text{MgX}$$
$$R_2'''\text{—C}\equiv\text{CMe}$$

wherein $R_2'$ is methyl, phenyl, substituted phenyl, or benzyl, $R_2''$ is a lower alkyl of 1–4 carbons, $R_2'''$ is hydrogen or a lower alkyl of 1–5 carbons, phenyl or phenyl lower alkyl having 1–2 carbons in the aliphatic portion, Me is selected from the group consisting of sodium, potassium, lithium or MgX and X is halogen; and the reaction product hydrolyzed. The hydrolysis product may then, optionally, be hydrogenated on the existing available double or triple bonds and, if desired, dehydrated. The product is then reacted with a cyano compound to form the corresponding exo-acid amide [Ritter-Reaction: Org. Reactions: vol. 17, 213–325 (1969)]. The exo-acid amides are then treated in a known manner to hydrolyze to the corresponding exo-amine, such as by heating with an acid or base, preferably with an acid, expediently at the reflux temperature of the reaction mixture.

The exo-amine is then dehydrogenated to the corresponding imine such as, for example, by treatment with t-butyl hypochlorite in an inert organic solvent such as, for example, ether, to form the corresponding N-chlorocompound and treatment of this compound with an organic or inorganic base such as, for example, sodium ethoxide.

The imine is finally hydrolyzed in a known manner to form compounds represented by Formula VIII such as, for example, by treatment with dilute mineral acid.

The compounds represented by Formula VIII wherein $R_2$ is methyl or phenyl can, for example, also be prepared from camphor by reaction with a Grignard reagent represented by the formula

wherein $R_2$ is methyl or phenyl and X is a halogen atom.

The reaction product is hydrolyzed, dehydrated, and the dehydration product treated with glacial acetic acid in the presence of a strong acid such as, for example, sulfuric acid or hydrochloric acid, to yield the corresponding $R_2$-substituted isobornyl acetate. The acetate is then saponified with caustic and the resulting 4-$R_2$-isoborneol oxidized to form 4-$R_2$-camphor.

Those compounds represented by Formula III wherein $R_2$ in Formula V is a substituted phenyl group can be prepared, for example, by introducing, in a known manner, the desired substituent into an unsubstituted phenyl group of the corresponding acid amide and then hydrolyzing the amide. Thus, a nitro group can be introduced by nitrating with nitric acid. An amino group can be obtained in a known manner, such as by reducing the nitro group. A hydroxy group may be obtained from a methoxy group by treatment with, for example hydrobromic acid.

The starting materials represented by Formula II are known compounds and can be prepared in a manner known in the art.

The starting materials represented by Formula IV are new compounds and are within the scope of the present invention. These compounds can, for example, be prepared by the reduction of a compound represented by the Formula I. The reduction is preferably carried out catalytically utilizing a catalyst such as, for example, palladium/charcoal, platinum, Raney-nickel and the like.

The novel compounds represented by Formula I are therapeutically useful as amoebicides and bacteriostats, particularly against gram-negative bacteria such as, for example, *Escherichia coli, Shigella sonnei* or *Shigella flexneri*.

Thus, for example, in the mouse, racemic 2-(2-exo-bornylamino)-3-chloro-1,4-naphthoquinone has an $LD_{50}$ of over 5000 mg./kg. p.o. and a $CD_{50}$ of 4 mg./kg. p.o. against *Escherichia coli*, 8 mg./kg. p.o. against *Shigella flexneri* and 7 mg./kg. p.o. against *Shigella sonnei*.

In the mouse, (−)-2-[(1R) - 2 - exo-bornylamino]-3-chloro-1,4-naphthoquinone has an $LD_{50}$ of over 5000 mg./kg. p.o. and a $CD_{50}$ of ca. 50 mg./kg. p.o. against *Shigella sonnei* and *Shigella flexneri*.

In the mouse, (+)-2-[(1R)-2-endo-bornylamino]-3-bromo-1,4-naphthoquinone has an $LD_{50}$ of over 5000 mg./kg. p.o. and a $CD_{50}$ of ca. 50 mg./kg. p.o. against *Shigella sonnei* and *Escherichia coli*.

The $CD_{50}$ values given above were obtained in accordance with the following procedure:

Groups of 5 mice were dewormed for 4 days. At the same time, they were placed on a carbohydrate-rich diet (popcorn). On the 5th day, no nourishment was administered. From the 6th day, until the end of the experiment they received drinking water which contained 4 g. of dihydrostreptomycin, 100 mg. of erythromycin and 400,000 units of mycostatin per litre. On the 6th day they again received popcorn. On the 7th day, once more no nourishment was administered. Likewise on the 8th day, no nourishment was administered and the animals were infected orally with 100 million streptomycin-, erythromycin- and mycostatin-resistant organisms of *Shigella sonnei, Shigella flexneri* or *Escherichia coli*. From the 9th day, the animals received popcorn until the end of the experiment. The test substance was administered for the first time 24 hours after the oral infection. In the case of *Shigella sonnei* and *Escherichia coli*, the test substance was administred 3 times and in the case of *Shigella flexneri* 5 times at 24-hour intervals. The animals infected by means of *Shigella flexneri* were sacrificed after one day and the animals infected by means of *Shigella sonnei* or *Escherichia coli* three days after the last treatment.

A piece of large intestine together with contents (ca. 200 mg.) was isolated and homogenized. Six different dilutions thereof were prepared as follows: 1/10,000; 1/50,000; 1/100,000; 1/500,000; 1/1,000,000 and 1/2,000,000.

A drop from each dilution was streaked on an agar plate. After incubation for 48 hours, the number of colonies was counted and with the corresponding dilutions there was calculated the germ count per gram of piece of intestine for each mouse. By comparison of the individual germ counts for 5 mice with the average germ counts of 5 untreated mice there was calculated the percentage germ reduction in each mouse. The results are stated in $CD_{50}$ values.

The novel therapeutic agents represented by Formula I may be administered enterally or parenterally. A preferred mode of administration is orally in suitable pharmaceutical preparations such as, for example, dragées, tablets, capsules and the like. Such preparation preferably contain about 100, 200 or 250 mg. of active substance per dosage unit. It is contemplated that, in the case of adults, a daily dosage of up to 1000 mg. of active substance, corresponding to 14 mg./kg./day is administered in several divided doses. This dosage regimen may be adjusted by the clinician as the therapeutic situation requires.

The novel therapeutic agents of the present invention are administered enterally, i.e., orally, or rectally, or parenterally in the form of pharmaceutical preparations which contain them in admixture with suitable pharmaceutical, organic or inorganic inert carrier materials which are suitable for such preparations. Such materials include, for example, water, gelatin, lactose, starches, magnesium stearate, talc, vegetable oils, gums, polyalkylene glycols, petroleum jelly and the like. The pharmaceutical preparations can be in solid unit dosage form, e.g., in tablets, dragées, suppositories, capsules or in liquid form, e.g., as solutions, suspensions or emulsions. Such preparations may be submitted to conventional pharmaceutical excipients such as, for example, sterilization and the like. They may also contain other therapeutically valuable substances or conventional pharmaceutical adjuvants such as preservatives, stabilizing agents, wetting agents, emulsifying agents, buffers and the like.

The following examples further illustrate the invention. All temperatures are in degrees centigrade.

EXAMPLE 1

A solution of 33.7 g. of rac.-2-endo-bornanamine in 50 ml. of abs. alcohol were added dropwise with stirring at room temperature to a suspension of 22.7 g. of 2,3-dichloro-1,4-naphthoquinone in 200 ml. of abs. alcohol. After the addition, the reaction mixture was boiled at reflux for 4 hours, to form a dark red solution. The reaction mixture was then evaporated under reduced pressure, the residue taken up in 300 ml. of chloroform, the chloroform solution successively shaken out with 100 ml. of water, three times with 100 ml. portions of 1 N hydrochloric acid and four times with 100 ml. portions of water. After drying over sodium sulfate, the organic phase was concentrated, treated with active charcoal and evaporated. After crystallization from n-hexane, there was obtained rac.-2-(2-endo-bornylamino)-3-chloro-1,4-naphthoquinone, M.P. 110°–111°.

EXAMPLE 2

A suspension of 4.45 g. of 2,3-dichloro-1,4-naphthoquinone in 30 ml. of abs. benzene were treated with 2.226 g. of triethylamine. A solution of 3.218 g. of rac.-2-endo-bornanamine in 10 ml. of abs. benzene was then added dropwise with stirring over a period of 35 min. After stirring for 2 hours, the dark red colored suspension was filtered, the filtrate evaporated and the residue dissolved in methylene chloride. The resulting solution was washed successively with water, 1 N hydrochloric acid and water, dried over sodium sulfate, filtered and evaporated. The residue was treated in hexane with active charcoal and the rac.-2-(2-endo-bornylamino)-3-chloro-1,4-naphthoquinone crystallized as red crystals, M.P. 109°–110°.

EXAMPLE 3

In analogous manner to that described in Example 1 or 2, the following compounds were manufactured.

(a) Starting from 2,3-dichloro-1,4-naphthoquinone and (+)-(1R)-2-endo-bornanamine, there was obtained (+)-2-[(1R)-2-endo-bornylamino]-3-chloro - 1,4 - naphthoquinone, M.P. 113°–115° (from hexane), $[\alpha]_D^{25} = +120°$ (c.=0.01 in alcohol);

(b) Starting from 2,3-dichloro-1,4-naphthoquinone and (−)-(1R)-2-exo-bornanamine, there was obtained (−)-2-[(1R)-2-exobornylamino]-3 - chloro - 1,4 - naphthoquinone, M.P. 97°–98° (from hexane), $|\alpha|_D^{25} = -175°$ (c.=0.03 in alcohol);

(c) Starting from 2,3-dibromo-1,4-naphthoquinone and (+)-(1R)-2-endo-bornanamine, there was obtained (+)-2-[(1R)-2-endobornylamino]-3-bromo - 1,4 - naphthoquinone, M.P. 102°–104° (from hexane-petroleum ether), $[\alpha]_D^{25} = +104°$ (c.=0.1 in alcohol);

(d) Starting from 2,3-dibromo-1,4-naphthoquinone and rac.-2-endo-bronanamine, there was obtained rac.-2-(2-endo-bornylamino)-3-bromo - 1,4 - naphthoquinone, M.P. 82°–84° (from hexane-petroleum ether);

(e) Starting from 1,4-naphthoquinone and rac.-2-endobornanamine, there was obtained rac.-2-(2-endo-bornylamino) - 1,4 - naphthoquinone, M.P. 181°–182° (from chloroform-petroleum ether);

(f) Starting from 2,3-dichloro-1,4-naphthoquinone and rac.-2-endo-norbornanamine, there was obtained rac.-3-chloro-2-(2-endo-norbornylamino)-1,4 - naphthoquinone, M.P. 100°–102° (from chloroform-petroleum ether);

(g) Starting from 2,3-dichloro-1,4-naphthoquinone and rac.-2-exo-norbornanamine, there was obtained rac.-3-chloro-2-(2-exo-norbornylamino) - 1,4 - naphthoquinone, M.P. 112°–114° (from chloroform-petroleum ether);

(h) Starting from 2,3-dichloro-1,4-naphthoquinone and rac.-2-exo-bornanamine, there was obtained rac.-2-(2-exobornylamino)-3-chloro - 1,4 - naphthoquinone, M.P. 89°–91° (from hexane);

(i) Starting from 1,4-naphthoquinone and rac.-2-exobornanamine, there was obtained rac.-2-(2-exo-bornylamino) - 1,4 - naphthoquinone, M.P. 163°–164° (from methylene chloride-petroleum ether);

(j) Starting from 2,3-dibromo-1,4-naphthoquinone and rac.-2-exo-bornanamine, there was obtained rac.-2-(2-exobornylamino)-3-bromo - 1,4 - naphthoquinone, M.P. 85°–87° (from hexane-petroleum ether);

(k) Starting from 2,3-dimethoxy-1,4-naphthoquinone and rac.-2-endo-bornanamine, there was obtained rac.-2-(2 - endo-bornylamino) - 3-methoxy-1,4-naphthoquinone; and (l) Starting from 2,3-dimethoxy-1,4-naphthoquinone and rac.-2-exo-bornanamine, there was obtained rac.-2-(2-exobornylamino)-3-methoxy-1,4-naphthoquinone.

EXAMPLE 4

A solution of 192.6 mg. of 2-chloro-1,4-naphthoquinone in 25 ml. of abs. dioxane was treated dropwise at room temperature with stirring with 153.3 mg. of rac.-2-endobornanamine dissolved in 5 ml. of abs. dioxane. The dark red reaction mixture was then heated to reflux and maintained for 70 min. The solvent was thereafter evaporated in vacuum, the residue taken up in 30 ml. of chloroform, washed with 10 ml. of water, 5 ml. of 1 N hydrochloric acid and water, dried over sodium sulfate, filtered and evaporated. The residue was resolved on 10.0 g. of kieselgel (0.2–0.5 mm.) with methylene chloride as the eluting agent. Fourteen fractions of 2–3 ml. of eluate were collected. Fractions 4–7 contained the desired product. These fractions were further washed in mthylene chloride with water, then dried over sodium sulfate, filtered and evaporated. The residue was crystallized from isopropyl ether to obtain rac.-2 - (2 - endo-bornylamino) - 3-chloro-1,4-naphthoquinone, M.P. 110°–111°.

EXAMPLE 5

A suspension of 11.13 g. of 2-chloro-3-methoxy-1,4-naphthoquinone in 100 ml. of abs. methanol was treated dropwise at 20° with stirring with 8.9 g. of rac.-2-endobornanamine dissolved in 20 ml. of abs. methanol over a period of 20 minutes. After boiling at reflux for 30 minutes, the deep red reaction mixture was concentrated under reduced pressure, the residue dissolved in 200 ml. of chloroform, shaken out with 100 ml. of 1 N hydrochloric acid and washed neutral with water. The organic phase was then dried over sodium sulfate, filtered and evaporated. There was obtained by recrystallization from n-hexane rac.-2 - (2 - endo - bornylamino) - 3 - chloro - 1,4 - naphthoquinone, M.P. 110°–111°.

EXAMPLE 6

A solution of 1.35 g. of rac.-2-endo-bornanamine in 10 ml. of abs. alcohol were added dropwise over a period of 5 minutes with stirring at 20° to a suspension of 1.0 g. of 2-acetoxy-3-chloro-1,4-naphthoquinone in 20 ml. of abs. alcohol. The reaction mixture was then refluxed for 20 minutes. After evaporation of the alcoholic solution, the residue was chromatographed on 20.0 g. of kieselgel (0.2–0.5 mm.) with methylene chloride as the eluting agent. In so doing, 12 fractions of 5 ml. each were collected. Fractions 5–8 contained rac.-2-(2-endo-bornylamino) - 3 - chloro - 1,4 - naphthoquinone which was crystallized from isopropyl ether, M.P. 109°–111°.

EXAMPLE 7

A suspension of 208.6 mg. 2-chloro-3-hydroxy-1,4-naphthoquinone in 5 ml. of abs. alcohol was treated with stirring at room temperature with 168.6 mg. of rac.-2-endobornanamine dissolved in 3 ml. of abs. alcohol. After stirring at room temperature for 60 minutes, the dark red solution was evaporated in vacuum, the residue treated with isopropyl ether and filtered. After evaporating off the mother liquor, the residue was chromatographed on 3.0 g. of kieselgel (0.2–0.5 mm.) with methylene chloride as the eluting agent. Fifteen fractions of 1 ml. each were collected. Fractions 5–12 contained rac.-2-(2-endo-bornylamino) - 3 - chloro - 1,4-naphthoquinone which was crystallized from methanol, M.P. 109°–110°.

EXAMPLE 8

A total of 388.3 mg. of the product of Example 3(d), i.e., rac.-2 - (2 - endo - bornylamino)-3-bromo-1,4-naphthoquinone, were heated to 100° with 848.0 mg. of lithium chloride in 50 ml. of abs. dimethylformamide. After 24 hours, the reaction mixture was concentrated to dryness, the residue taken up in ether and the solution washed with water, dried over sodium sulfate, filtered and evaporated. the residue crystallized from n-hexane to obtain rac.-2-(2-mm.) utilizing methylene chloride as the eluting agent. The product obtained after evaporating off the eluate was crystallized from isopropyl ether. Tehre was obtained rac.-2 - (2 - endo - bornylamino)-3-chloro-1,4-naphthoquinone, M.P. 110°–111°.

EXAMPLE 9

Oxygen gas was conducted through a solution of 100.0 mg. of rac.-2 - (2 - endo-bornylamino)-3-chloro-1,4-dihydroxy-naphthalene in 20 ml. of abs. alcohol for 2 hours. The red solution was thereafter evaporated in vacuum and the residue crystallized from n-hexane to obtain rac.-2-(2-endo-bornylamino) - 3-chloro-1,4-naphthoquinone, M.P. 109°–111°.

The rac.-2 - (2 - endo-bornylamino)-3-chloro-1,4-dihydroxynaphthalene used as the starting material was manufactured as follows:

A solution of 3.43 g. of rac.-2-(2-endo-bornylamino)-3 - chloro - 1,4-naphthoquinone in 100 ml. of absolute alcohol was hydrogenated at room temperature in the presence of 500 mg. of palladium/charcoal (5%). The hydrogenation mixture was then separated from the catalyst under nitrogen, the solution concentrated and the residue crystallized from hexane, M.P. 152°–154°.

EXAMPLE 10

Dry chlorine gas was conducted for 2 minutes through the solution of 1.545 g. of the product of Example 3(e), i.e., rac.-2-(2-endo-bornylamino)-1,4-naphthoquinone, in 25 ml. of abs. dimethylformamide. There was thus obtained a light yellow solution and the reaction mixture slightly warmed. After stirring at room temperature for 90 minutes, the reaction mixture was evaporated in vacuum and the dark red residue taken up in the chloroform. The solution was washed neutral with water, dried over sodium sulfate, filtered and evaporated. The residue was coarsely resolved on kieselgel (0.2–0.5 mm.) with methylene chloride and the enriched fractions once more chromatographed on 15.0 g. of kieselgel (0.2–0.5 mm.) with methylene chloride as eluting agent (34 fractions of 1 ml.) After crystallization from methanol, fractions 16–27 yielded rac. - 2 - (2-endo-bornylamino)-3-chloro-1,4-naphthoquinone, M.P. 109°–110°.

EXAMPLE 11

A suspension of 11.35 g. of 2,3-dichloro-1,4-naphthoquinone in 100 ml. of abs. alcohol was treated, with stirring, over a period of 15 minutes with a solution of 16.73 g. of rac.-2-endo-1,4,7,7-tetramethylnorbornanamine in 50 ml. of abs. alcohol. The resulting dark red solution was refluxed for two hours. The reaction mixture was thereafter evaporated under reduced pressure. The residue was dissolved in 200 ml. of methylene chloride and successively shaken out with 100 ml. of water, three times with 50 ml. portions of 1 N hydrochloric acid and three times with 100 ml. portions of water. After drying over sodium sulfate, the methylene chloride solution was concentrated, treated with active charcoal and evaporated. After crystallization from methylene chloride-n-hexane, there was obtained rac.-3-chloro-2-[(1,4,7,7-tetramethyl-2 - endo-norbornyl)amino] - 1,4 - naphthoquinone, M.P. 114°–115°. The rac.-2-endo-1,4,7,7-tetramethyl-norbornanamine used as the starting material was manufactured as follows:

A solution of 140.0 g. of rac.-1,4,7,7-tetramethyl-2-norbornyl oxime in 1700 ml. of abs. alcohol was hydrogenated in the presence of 1.4 g. of ammonium carbonate and 14.0 g. of Raney nickel at 170 atmoshperes hydrogen pressure and 110° for 5 hours (inclusive of heat-up time). The solution, separated from the catalyst, was made Congo acidic with alcoholic hydrochloric acid and concentrated under reduced pressure. The crude hydrochloride salt was crystallized from alcohol/ether, M.P. over 300°.

The resulting hydrochloride salt (130.6 g.) was dissolved in water and the amines released with the calculated amount of sodium hydroxide. The precipitated base was taken up in ether, washed with water, dried over sodium sulfate, filtered and concentrated. There was thus obtained 117.4 g. of crude base.

By means of nuclear resonance spectroscopy, it can be established that the amine mixture consisted of 4-methyl-2-endobornanamine and 4-methyl-2-exo-bornanamine in the proportion 7:3.

Two stereoisomers were separated by fractional crystallization of their acetates as follows:

A solution of 117.4 g. of amine in 1000 ml. of abs. ether was cooled to —20° and treated dropwise with stirring with a solution of 29.6 g. of glacial acetic acid in 100 ml. of abs. ether over a period of 45 minutes. After the addition was completed the mixture was stirred for a further 10 minutes and the precipitated acetate filtered off, washed with abs. ether and dried. There was thus obtained 111.7 g. of the acetate of the endo compound. The acetate of the exo compound remained in the mother liquor.

The 111.7 g. of acetate of the endo compound were dissolved in 500 ml. of water and the base was released with the calculated amount of sodium hydroxide. The precipitated amine was taken up in ether, washed with water, dried over sodium sulfate and concentrated. According to thin layer chromatography, the crude residue (86.5 g.) was rac.-1,4,7,7-tetramethyl-2-endnorbornanamine enriched to 90%.

The 86.5 g. of amine thus-formed were dissolved in 850 ml. of abs. ether, cooled to —20° and treated dropwise with stirring with a solution of 24.82 g. of glacial acetic acid in 100 ml. of abs. ether over a period of 45 minutes. The precipitated acetate was filtered off and dried. There was obtained 93 g. of acetate of the endo compound and the acetate of the exo compound remained in the mother liquor.

The resulting 93 g. of acetate of the endo compound were dissolved in water and the base was released with the calculated amount of sodium hydroxide. The base was taken up in ether, washed with water, dried over sodium sulfate and filtered. The filtrate was treated with ca. 100 ml. of alcohol and made Congo acidic with alcoholic hydrochloric acid. After evaporation of the solution and crystallization from alcohol/ether, there was obtained rac.-1,4,7,7 - tetramethyl - 2 - endo - norbornanamine hydrochloride with a melting point of over 300°.

The rac.-1,4,7,7-tetramethyl-2-exo-norbornanamine was isolated from the respective mother liquors.

EXAMPLE 12

A suspension of 4.42 g. of 2,3-dichloro-1,4-naphthoquinone in 50 ml. of abs. alcohol was treated with 6.5 g. of rac. - 2 - exo-1,4,7,7-tetramethyl-norbornanamine in 50 ml. of abs. alcohol. The reaction mixture was then refluxed for 3 hours. The resulting dark red solution was evaporated and the residue dissolved in 100 ml. of methylene chloride, shaken out with 50 ml. of water, three times with 25 ml. portions of 3 N hydrochloric acid and four times with 50 ml. portions of water. The organic phase was thereafter dried over sodium sulfate, filtered, concentrated, treated with active charcoal and evaporated. The residue was recrystallized from n-hexane-petroleum ether (40–45°). In this manner there was obtained rac.-3 - chloro - 2-[1,4,7,7-tetramethyl-2-exo-norbornyl)amino]-1,4-naphthoquinone, M.P. 127–129°.

The rac.-2-exo-1,4,7,7-tetramethylnorbornanamine used as the starting material was isolated from the mother liquors obtained in Example 11.

EXAMPLE 13

A suspension of 4.54 g. of 2,3-dichloro-1,4-napthoquinone in 100 ml. methylene chloride were treated at room temperature with 4.45 g. triethylamine to form a brown-green suspension. To this mixture was added 5.564 g. of rac.-4-propyl-2-exo-bornanamine hydrochloride and the reaction mixture maintained under reflux for 24 hours. Thereafter, the reaction mixture was worked up. The methylene chloride solution was successively shaken with water, with 1 N hydrochloric acid and again with water, dried over sodium sulfate, filtered and evaporated. The residue was recrystallized from alcohol. There was obtained crude crystals of rac.-3-chloro-2-[(4-propyl-2-exobornyl)amino] - 1,4 - naphthoquinone having a M.P. of 109°–111°. From the mother liquor there was obtained by crystallization additional product have a M.P. of 108°–110°.

The rac. - 4 - propyl-2-exo-bornanamine hydrochloride utilized as the starting material can be obtained from the corresponding oxime in a manner analogous to that of Examples 11 and 12.

EXAMPLE 14

A suspension of 2.27 g. of 2,3-dichloro-1,4-naphthoquinone in 50 ml. of methylene chloride was treated at room temperature with 2.43 g. triethylamine. To the resulting brown green suspension was added 3.455 g. rac.-4-heptyl-2-exo-bornanamine-hydrochloride and the mixture boiled under reflux for 17 hours. The reaction mixture was then successively shaken out with water, 1 N hydrochloric acid and again with water, dried over sodium sulfate, filtered and evaporated. The residue was recrystallized from alcohol to yield rac.-3-chloro-2-](4-heptyl-2-exo-bornyl)-amino]-1,4-naphthoquinone, M.P. 80°-82°.

The rac. - 4 - heptyl-2-exo-bornanamine-hydrochloride starting material can be manufactured as follows:

12.16 grams of magnesium shavings were suspended in 350 ml. absolute ether and a solution of 55.6 g. ethyl bromide in 50 ml. absolute ether was added with stirring over a period of 70 minutes. After the addition was completed, the reaction mixture was heated under reflux for 60 minutes, cooled to room temperature and a solution of 48.9 g. heptyne-(1) in 50 ml. absolute ether was added dropwise over a period of 60 minutes. The reaction mixture was heated to reflux and maintained with shaking for 18 hours. 76.1 grams of rac.-camphor dissolved in 50 ml. of absolute ether were then added dropwise over a period of 60 minutes. The reaction mixture was then maintained under reflux for 20 hours. The reaction mixture was cooled by shaking with ice water and washed with 50 ml. of water and 200 ml. of 1:1 mixture of water and hydrochloric acid. The ether phase was then washed neutral with five 150 ml. portions of water, dried over sodium sulfate, filtered and evaporated. The residue (114.5 g.) was put under water vapor distillation and 1.8 liter of distillate was collected. The distillate was mixed with 300 ml. of ether, the phases separated and the ether phase washed three times with 150 ml. portions of water, dried under sodium sulfate, filtered and evaporated. There was obtained 71.4 g. rac.-2-heptynyl-2-borneol, B.P. 99–100°/0.01 mm. Hg.

A total of 70.3 g. rac.-2-heptynyl-2-borneol were hydrogenated with shaking in the presence of acetic acid with 1 g. platinum dioxide at room temperature and normal pressure. After three hours, the reaction was stopped, 12.75 liters of hydrogen having been consumed. The catalyst was separated by filtration and the filtrate concentrated utilizing a rotary evaporator with a water aspirator. The residue was taken up in 300 ml. ether, shaken eight times with 100 ml. portions of water, the ether solution dried over sodium sulfate, filtered and evaporated. There was obtained rac.-2-heptyl-2-borneol, boiling point 103–105°/0.01 mm. Hg.

A mixture of 50 ml. glacial acetic and 4.22 g. concentrated sulfuric acid was warmed to about 60°. Thereafter, a mixture of 10.1 g. rac.-2-heptyl-2-borneol and 3.61 g. acetonitrile in 30 ml. glacial acetic acid was added dropwise over a period of 20 minutes with agitation. The reaction mixture was stirred at 60° for 19 hours, 4.22 g. conc. sulfuric acid and 3.61 g. acetonitrile were added and the reaction mixture held at 60° for an additional 23 hours. The reaction mixture was then brought to room temperature and then poured over about 300 g. of ice and allowed to stand for one hour. The oil which separated was taken up in 200 ml. of ether, shaken twice with 100 ml. portions of water, twice with 50 ml. portions of sodium carbonate solution and three times with 150 ml. portions of water, dried over sodium sulfate, filtered and evaporated. The residue was chromatographed on 260.0 g. kieselgel (0.2–0.5 mm.) with methylene chloride as the eluting agent. There were obtained 180 fractions of 10 ml. each. After crystallization from methanol, fractions 148–160 gave rac.-N-(4-heptyl-2-exo-bornyl)acetamide, M.P. 94°–96°.

A total of 13.8 g. rac.-N-(4-heptyl-2-exo-bornyl)acetamide was mixed with stirring with 140 ml. 6 N hydrochloric acid and 70 ml. ethanol and maintained under reflux conditions for 48 hours. The reaction was then cooled with ice and the resulting crystals separated by filtration. There was obtained from the residue by crystallization from an ether-petroleum ether mixture rac.-4-heptyl - 2 - exo-bornanamine-hydrochloride, M.P. 242°– 244°. There was obtained an additional quantity of product from the ether-petroleum ether mother liquor.

EXAMPLE 15

A solution of 2.3 g. of 2,3-dichloro-1,4-naphthoquinone in 50 ml. of methylene chloride was heated to reflux temperature and a second solution of 2.3 g. rac.-4-phenyl-2-exo-bornanamine and 1.38 ml. triethylamine in 50 ml. methylene chloride was added dropwise over a period of 80 minutes. After an hour, an additional 0.458 g. of rac.-4-phenyl-2-exo-bornanamine were added. After an additional 4 hours, the reflux was stopped and the mixture cooled, shaken three times with water, dried over sodium sulfate and evaporated in a vacuum. The residue was crystallized from an ether-hexane mixture. Recrystallization from methylene chloride-hexane yielded rac.-3-chloro-2-[(4-phenyl-2-exo-bornyl)amino] - 1,4 - naphthoquinone in the form of red crystals, M.P. 121°–122°.

The rac.-4-phenyl-2-exo-bornanamine used as the starting material can be produced from the corresponding oxime in an analogous manner to that of Examples 11 and 12.

EXAMPLE 16

A solution of 2.6 g. rac.-4-phenethyl-2-exo-bornanamine and 1.38 ml. triethylamine in 50 ml. benzene was added dropwise to a solution of 2.3 g. 2,3-dichloro-1,4-naphthoquinone in 50 ml. benzene which was maintained at 50°. After the addition was complete, the mixture was stirred at 60° for 24 hours and then an additional 0.51 g. rac.-4-phenethyl-2-exo-bornanamine was added and the mixture stirred for another 24 hours. The mixture was allowed to cool and then was shaken with water. The benzene phase was evaporated and the residue crystallized from a mixture of methylene chloride and hexane. There was obtained rac.-3-chloro-2-[(4-phenethyl-2-exo-bornyl)amino] - 1,4 - naphthoquinone in the form of red crystals, M.P. 133°–134°. The starting material, rac.-4-phenethyl-2-exo-bornanamine, was produced in the following manner:

A total of 61.0 g. of phenethyl-borneol in 60 ml. acetic anhydride was heated under reflux for 4 hours. The mixture was subsequently evaporated in a vacuum. The residue was treated with benzene and water and neutralized with sodium carbonate. The phases was separated and the water phase shaken twice with benzene. The combined benzene phases were dried over sodium sulfate, filtered and evaporated. The residue was distilled in a vacuum (0.01 mm. Hg). There was obtained rac.-2-(1-phenethylidene)camphane.

A mixture of 72.0 g. of the rac.-2-(1-phenethylidene) camphane thus-obtained and 24.6 g. acetonitrile were added dropwise over a period of 5 minutes to a solution of 60 ml. concentrated sulfuric acid in 900 ml. glacial acetic acid which had been warmed to 60°. The mixture was maintained at 60° for 10 hours after which an additional 24.6 g. acetonitrile were added. After another 10 hours at 60°, the reaction mixture was poured over 1.5 kg. of ice and exhaustingly extracted with methylene chloride. The combined methylene chloride phases were washed with an aqueous solution of sodium hydrogen carbonate, dried over sodium sulfate and evaporated. The residue was crystallized from a 1:2 mixture of n-hexane and methylene chloride to yield rac.-N-(4-phenethyl-2-exo-bornyl)-acetamide with a M.P. of 169°–171°. Working up of the mother liquor yielded an additional quantity of the same material having a M.P. of 166°–169°.

A total of 8.1 g. of rac.-N-(4-phenethyl-2-exo-bornyl)-acetamide obtained above was heated under reflux for 60 hours with 800 ml. 6 N hydrochloric acid and 400 ml. ethanol. The reaction mixture was then evaporated in a vacuuum. The residue was crystallized from a methanol-water mixture thus obtaining rac.-4-phenethyl-2-exo-bornanamine hydrochloride, M.P. 277°–278°.

EXAMPLE 17

To a boiling solution of 2.3 g. of 2,3-dichloro-1,4-naphthoquinone in 50 ml. methylene chloride was added dropwise over a period of 80 minutes a solution of 2.7 g. of rac.-4-(p-nitrophenyl)-2-exo-bornanamine and 1.38 ml. triethylamine in 50 ml. methylene chloride. After three hours, an additional 0.35 g. of rac.-4-(p-nitrophenyl)-2-exo-bornanamine dissolved in methylene chloride was added to the mixture. The reaction mixture was maintained at reflux for an additional 72 hours. The resulting solution was thereafter shaken four times with a little water, dried over sodium sulfate and treated with n-hexane until turbidity began to appear. The reaction mixture was then allowed to stand in an ice bath to allow crystallization to take place and the resulting crystals were recrystallized from a mixture of methylene chloride and n-hexane. There was thus obtained rac.-3-chloro-2-[(4-p-nitrophenyl - 2 - exo-boryl)amino]-1,4-naphthoquinone, M.P. 180°–181°.

The starting material, i.e., rac.-4-(p-nitrophenyl)-2-exo-bornanamine, was obtained in the following manner:

A mixture of 34.5 g. 2-phenylborneol and 15.8 ml. acetonitrile were added dropwise over a period of several minutes to a solution of 32.0 g. concentrated sulfuric acid in 450 ml. of glacial acetic acid, which had been warmed to 60°. After 6 hours at 60°, an additional 15.8 ml. of acetonitrile was added and the mixture stirred at 60° for an additional 15 hours. The reaction mixture was then poured over ice and extracted with methylene chloride. The combined methylene chloride phases were shaken with a saturated solution of sodium hydrogen carbonate, dried over sodium sulfate and evaporated. The residue was crystallized from a mixture of methylene chloride and hexane. There was thus obtained rac.-N-(4-phenyl-2-exo-bornyl)acetamide, M.P. 151°–152°. The mother liquor was thereafter chromatographed with methylene chloride on kieselgel to obtain an additional quantity of product.

A total of 21.6 g. of the above product, i.e., rac.-N-(4-phenyl-2-exo-bornyl)acetamide, was treated with 120 ml. concentrated nitric acid. The mixture was cooled to −10° and 72 ml. concentrated sulfuric acid were added dropwise with stirring. The reaction mixture was then held for another 25 hours at −10°. The mixture was then allowed to warm to 0° and poured over 1 kg. of ice. The mixture was extracted with methylene chloride and the organic phase dried over sodium sulfate and evaporated. The residue was crystalized from a mixture of acetone and n-hexane to obtain rac.-N-[4-(p-nitrophenyl)-2-exo-bornyl]-acetamide, M.P. 205°–206°.

A total of 6.32 g. of the above product, i.e., rac.-N-[4-(p-nitrophenyl)-2-exo-bornyl]-acetamide was heated under reflux for 72 hours with a mixture of 300 ml. ethanol and 600 ml. 6 N hydrochloric acid. The mixture was then evaporated in a vacuum and crystallized from a mixture of methanol and water to obtain rac.-4-(p-nitrophenyl)-2-exo-bornanamine hydrochloride, M.P. 347° (decomposition).

EXAMPLE 18

The following ingredients were homogeneously blended and filled into gelatin capsules utilizing a conventional capsule filling machine.

| Ingredient: | Amount per capsule, mg. |
|---|---|
| Rac.-2-(2-exo-bornylamino)-3-chloro-1,4-naphthoquinone | 200 |
| Lactose | 110 |
| Corn starch | 35 |
| Talc | 5 |
| Total | 350 |

EXAMPLE 19

Tablets were prepared utilizing the following ingredients.

| Ingredient: | Weight per tablet, mg. |
|---|---|
| Rac.-2-(2-exo-bornylamino)-3-chloro-1,4-naphthoquinone | 100 |
| Lactose | 50 |
| Corn starch | 23 |
| Calcium stearate | 2 |
| Total | 175 |

The active substance was homogeneously mixed with the lactose and corn starch, passed through a sieving machine, moistened with water to form a granulation. The granulation was dried, comminuted, mixed with the calcium stearate and pressed into tablets.

What is claimed is:

1. Compounds represented by the formula

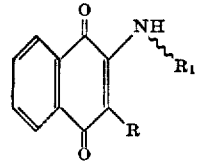

wherein R is hydrogen, halogen or lower alkoxy and $R_1$ is

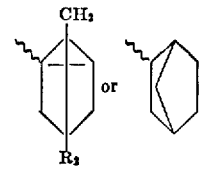

wherein $R_2$ is hydrogen, lower alkyl, phenyl, substituted phenyl wherein the substituents are selected from the group consisting of halogen, nitro, amino and hydroxy or phenyl lower alkyl.

2. A compound in accordance with claim 1 wherein R is chloro and $R_1$ is 2-endo-bornyl, i.e., the compound rac.-2-(2-endo-bornylamino)-3-chloro - 1,4 - naphthoquinone.

3. A compound in accordance with claim 1 wherein R is chloro and $R_1$ is (1R)-2-endo-bornyl, i.e., the compound (+)-2-[(1R)-2-endo-bornylamino]-3-chloro-1,4-naphthoquinone.

4. A compound in accordance with claim 1 wherein R is chloro and $R_1$ is (1R)-2-exo-bornyl, i.e., the compound (−) - 2 - [(1R) - 2 - exo-bornylamino]-3-chloro-1,4-naphthoquinone.

5. A compound in accordance with claim 1 wherein R is bromo and $R_1$ is (1R)-2-endo-bornyl, i.e., the compound (+) - 2 - [(1R) - 2 - endo-bornyl-amino]-3-bromo-1,4-naphthoquinone.

6. A compoend in accordance with claim 1 wherein R is bromo $R_1$ is 2-endo-bornyl, i.e., the compound rac.-2-(2-endo-bornylamino)-3-bromo-1,4-naphthoquinone.

7. A compound in accordance with claim 1 wherein R is hydrogen and $R_1$ is 2-endo-bornylamino, i.e., the compound rac. - 2 - (2 - endo-bornylamino) - 1,4-naphthoquinone.

8. A compound in accordance with claim 1 wherein R is chloro and $R_1$ is 2-endo-norbornyl, i.e., the compound rac. - 3 - chloro - 2 - (2 - endo-norbornylamino)-1,4-naphthoquinone.

9. A compound in accordance with claim 1 wherein R is chloro and $R_1$ is 2-exo-norbornyl, i.e., the compound rac. - 3 - chloro - 2 - (2 - exo-norbornylamino)-1,4-naphthoquinone.

10. A compound in accordance with claim 1 wherein R is chloro and $R_1$ is 2-exo-bornyl, i.e., the compound rac. - 2 - (2 - exo-bornylamino) - 3 - chloro - 1,4-naphthoquinone.

11. A compound in accordance with claim 1 wherein R is hydrogen and $R_1$ is 2-exo-bornyl, i.e., the compound rac. - 2 - (2 - exo-bornylamino) - 3 - chloro - 1,4-naphthoquinone.

12. A compound in accordance with claim 1 wherein R is bromo and $R_1$ is 2-exo-bornyl, i.e., the compound rac. - 2 - (2 - exo-bornylamino) - 3 - bromo - 1,4-naphthoquinone.

13. A compound in accordance with claim 1 wherein R is methoxy and $R_1$ is 2-endo-bornyl, i.e., the compound rac. - 2 - (2 - endo-bornylamino) - 3 - methoxy - 1,4-naphthoquinone.

14. A compound in accordance with claim 1 wherein R is methoxy and $R_1$ is 2-exo-bornyl, i.e., the compound rac. - 2 - (2 - exo-bornylamino) - 3 - methoxy - 1,4-naphthoquinone.

15. A compound in accordance with claim 1 wherein R is chloro and $R_1$ is 2 - endo - 1,4,7,7-tetramethylnorbornyl, i.e., the compound rac. - 3 - chloro - 2 - [2-endo(1,4,7,7 - tetramethylnorbornyl)-amino] - 1,4-naphthoquinone.

16. A compound in accordance with claim 1 wherein R is chloro and $R_1$ is 2 - exo - 1,4,7,7-tetramethylnorbornyl, i.e., the compound rac. - 3 - chloro - 2 - [2-exo - (1,4,7,7 - tetramethylnorbornyl)amino] - 1,4-naphthoquinone.

17. A compound in accordance with claim 1 wherein R is chloro and $R_1$ is 4 - n-propyl-2-exo-bornyl, i.e., the compound rac. - 3 - chloro - 2 - [(4 - propyl - 2 - exo-bornyl)-amino]-1,4-naphthoquinone.

18. A compound in accordance with claim 1 wherein R is chloro and $R_1$ is 4-n-heptyl-2-exo-bornyl, i.e., the compound rac. - 3 - chloro - 2 - [(4-heptyl-2-exo-bornyl)-amino]-1,4-naphthoquinone.

19. A compound in accordance with claim 1 wherein R is chloro and $R_1$ is 4-phenyl-2-exo-bornyl, i.e., the compound rac. - 3 - chloro - 2 - [(4-phenyl-2-exo-bornyl)-amino]-1,4-naphthoquinone.

20. A compound in accordance with claim 1 wherein R is chloro and $R_1$ is 4-phenethyl-2-exo-bornyl, i.e., the compound rac. - 3 - chloro - 2 - [(4-phenethyl-2-exo-bornyl)-amino]-1,4-naphthoquinone.

References Cited

Chem. Abstracts, 40:4728 [4].
Chem. Abstracts, 57:12961b.
Chem. Abstracts, 70:57493n.

VIVIAN GARNER, Primary Examiner

U.S. Cl. X.R.

260—497 R, 501.1, 501.21, 561 R, 562 R, 563 P, 566 A, 566 R, 571, 578, 579, 586 R, 590, 617 E, 617 F, 618 F, 631.5, 668 F; 424—325, 330